United States Patent [19]

Ericson

[11] Patent Number: 4,911,394
[45] Date of Patent: Mar. 27, 1990

[54] LOAD HOOK

[75] Inventor: Sven O. Ericson, Nyköping, Sweden

[73] Assignee: Ted Zettergren AB, Sweden

[21] Appl. No.: 319,627

[22] Filed: May 8, 1989

Related U.S. Application Data

[63] Continuation of Ser. No. 93,548, filed as PCT SE86/00559 on Dec. 9, 1986, published as WO87/03657 on Jun. 18, 1987, abandoned.

[30] Foreign Application Priority Data

Dec. 12, 1985 [SE] Sweden .................................. 8505890

[51] Int. Cl.⁴ ............................................. F16B 45/06
[52] U.S. Cl. ...................................... 248/304; 248/301
[58] Field of Search .................................. 248/304–307, 248/301, 339; 24/230.5 AB, 230.5 R, 116 R; 114/114

[56] References Cited

U.S. PATENT DOCUMENTS

| 520,955 | 6/1894 | Evans | 24/230.5 AD |
| 2,211,273 | 8/1940 | Kleckner | 24/241 P |
| 3,923,278 | 12/1975 | Marcil | 248/304 X |

FOREIGN PATENT DOCUMENTS

| 14526 | of 1898 | United Kingdom | 114/114 |
| 881696 | 11/1961 | United Kingdom | 114/114 |

Primary Examiner—Alvin C. Chin-Shue
Attorney, Agent, or Firm—Silverman, Cass & Singer, Ltd.

[57] ABSTRACT

A load hook intended to be attached to the outer end of a crane jib, a crane wire or corresponding device. According to the invention, the load hook (1) comprises two opposed hooks (2,3) connected to and extending in spaced parallel relationship with each other, where each hook comprises a substantially U-shaped portion (4,5) forming a U-shaped groove (6,7) intended to support a carrying member connected to a load.

5 Claims, 2 Drawing Sheets

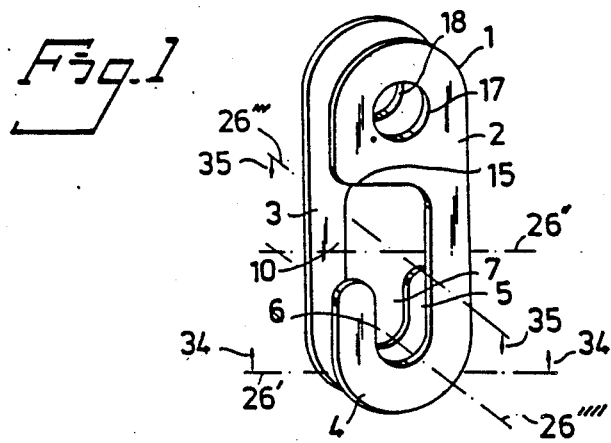
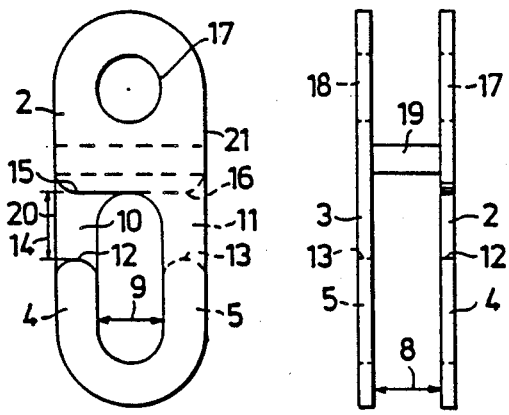
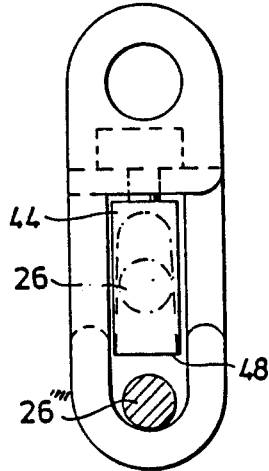
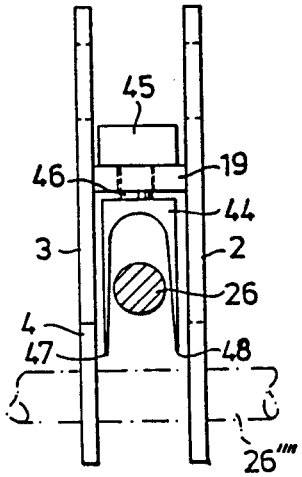

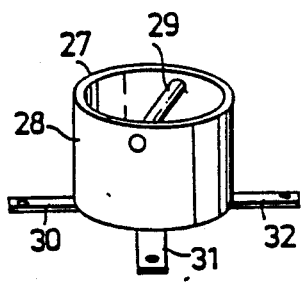
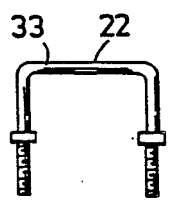
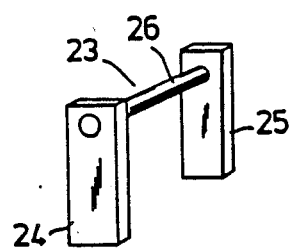
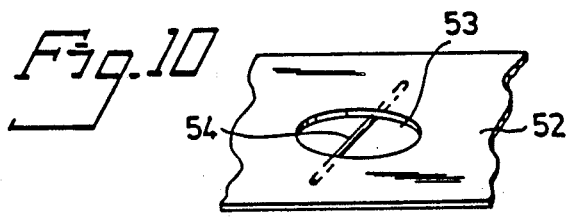
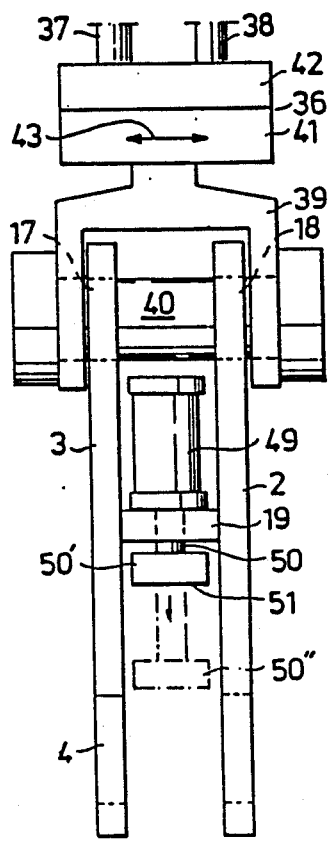

LOAD HOOK

This is a continuation of application Ser. No. 07/093,548 filed as PCT SE86/00559 on Dec. 9, 1986, published as WO87/03657 on Jun. 18, 1987, now abandoned.

This invention relates to a load hook intended to be attached to a crane or crane wire.

Load hooks are previously known in a great number of different designs. One problem with known hooks is that, owing to their design, a person must attach the hook in a lifting eye or corresponding device, when a load is to be lifted. After completed lifting, the hook must be disconnected manually. Known hooks normally are equipped with a safety catch in the form of a spring-loaded tongue, which in its locking position bridges the hook opening, so that the lifting eye or corresponding device cannot drop out of the hook by mistake. This safety catch, too, must be operated manually.

The present invention relates to a load hook, by which the said manual work can be eliminated. The load hook, furthermore, can be utilized together with known turning devices, whereby a load can be controlled very well. These and other advantages become apparent more clearly from the following.

The present invention, thus, relates to a load hook to be attached to the outer end of a crane jib, to a crane wire or a corresponding device, and is characterized in that the load hook comprises two opposed hooks connected to and extending in spaced parallel relationship with each other, where each hook comprises a substantially U-shaped portion forming a U-shaped groove intended to support a carrying member connected to a load.

The present invention is described in greater detail in the following with reference to the accompanying drawings, in which FIG. 1 is a perspective view of the load hook in question, FIG. 2 is a side view of the hook, FIG. 3 shows the hook seen from the left in FIG. 2, FIG. 4 shows a modified embodiment of the hook corresponding to the view shown in FIG. 2, FIG. 5 shows the hook shown in FIG. 4 seen from the left in FIG. 4, FIGS. 6–8 and FIG. 10 show different examples of attachments, FIG. 9 shows another modified embodiment of the hook seen in a view corresponding to the one shown in FIG. 3.

In FIG. 1 a load hook 1 according to the present invention is shown. The load hook comprises two opposed hooks 2,3, which are connected to and in parallel with each other. Each of the hooks comprises a substantially U-shaped portion 4,5 forming a U-shaped groove 6,7 intended to support a carrying member connected to a load. Such a carrying member may consist, for example, of belts, lifting eyes etc.

The distance 8 between the hooks 2,3 corresponds to the width 9 of said U-shaped grooves 6,7. The load hook 1 is designed so that the height 14 of the opening 10,11 of each hook 2,3, counted from the free end 12,13 of the U-shaped portion 4,5 to a portion 15,16 of the hook opposed to said end 12,13, corresponds to the width 9 of said U-shaped groove 6,7.

It is obvious, that the widths 8,9 and 14 can be varied within wide limits, which are chosen with regard to the carrying members intended and are chosen so, that the distances correspond to each other in such a meaning, that the distances 8 and 14 are suitable in consideration of the distance 9.

An axle attachment is provided in the upper portion of the load hook 1, i.e. in the portion facing away from said U-shaped portion 4,5. The axle attachment has a hole 17,18 through each hook.

The two hooks 2,3 preferably are formed of heavy plate or corresponding material and have constant thickness, as appears from FIG. 3. The hooks 2,3 are connected to each other by means of a bridge 19 extending perpendicularly to the plane of the hooks 2,3.

The load hook, further, is designed so that, seen in a plane perpendicular to the plane of the hooks 2,3, i.e. as shown in FIG. 2, it has two parallel edges 20,21 where the distance between the edges constitutes the greatest width of the load hook 1.

Examples of carrying members have been mentioned above. In FIGS. 6–8 and 10 examples of carrying members are shown, where the carrying member 22 according to FIG. 7 is a lifting eye, which is intended to be bolted in an object. FIG. 8 shows a carrying member 23 comprising two posts 24,25, which can be attached in an object to be lifted, and a rod 26 extending between the posts 24,25. In FIG. 6 a carrying member 27 is shown, which comprises a cylinder 28 where a rod 29 extends diagonally in the upper part of the cylinder. The cylinder 28 can be provided with an attachment iron 30,31,32 intended to be secured in an object.

Carrying members particularly suitable to be used together with the present hook comprise a rod 26,29,33, which is arranged substantially horizontally on the objects to be lifted. A pallet lift, for example, can be carried out with such a rod, as well as buckets, containers of various kind etc. can be lifted, i.e. devices utilized for goods or materials to be lifted for being loaded thereon or therein.

FIG. 10 shows an attachment in a platform body or a boat floor plate 52, where a hole 53 has been made and a rod 54 be welded on the platform or on the lower surface of the plate diagonally over the hole. Due to the load hook being narrow and slender, the hole 53 can be given a diameter which is considerably smaller than in the case when a conventional hook of normal size is used.

The mode of operation of the load hook is described in the following with reference to FIG. 1 and a carrying member according to FIG. 8. The load hook 1 is turned so that the planes of the hooks 2,3 are in parallel with the rod 26. The load hook 1 is lowered over the rod 26 so that the rod is inserted, according to arrows 34, between the hooks to an upper position marked by the dash-dotted line 26″ in FIG. 1. The numeral 26′ designates the rod when it has been inserted partially between the hooks 2,3. The load hook 1 is thereafter turned about a vertical axle so that the rod assumes the position relative to the load hook 1 which is designated by the line 26‴. The load hook 1 finally is lifted, whereby the rod is moved relative to the load hook from the position designated by 26‴, as indicated by the arrows 35, to the position 26″″ where the rod rests in the U-shaped portion 4,5 of each hook. The load hook is disengaged in reverse order, i.e. the load hook is moved downward, turned and moved upward.

The load hook preferably is connected to a so-called rotator at the outer end of a crane jib or to a device suspended on wires from a crane jib. Such a rotator can be of a suitable known type and be arranged so as by driving rotating the load hook relative to the crane.

In FIG. 9 a rotator 36 is shown, the upper portion 42 of which is attached to stays 37,38 on wires or the outer end of a crane jib. The lower portion 41 of the rotator is connected with the load hook via a yoke 39 by means of an axle 40. The lower portion 41 of the rotator is rotatably connected to the upper portion 42, as indicated by the arrow 43.

By lifting and lowering the load hook and by turning it by means of the rotator 36, thus, the load hook is attached and disengaged without manual work required to be carried out. This renders possible rapid handling of goods and, in given cases, rapid toil changes.

Due to the mounting of the hooks in spaced relationship, also a good balance of the load is obtained. It is further possible by means of the rotator to turn the load hook and thereby simply and rapidly to direct the load so that it can be stored in a definite place.

A further essential advantage is that the rod 26 cannot drop out of the load hook even when the load sways so that the rod for short moments is displaced upwardly relative to the load hook, because in order to be caused to drop out, it is required that the rod is displaced upward through a considerable distance and that the load hook is turned while the rod is in moved-upward position.

The present load hook, thus, is much safer than known hooks without safety catch.

According to a preferred embodiment, however, a substantially U-shaped locking member 44, see FIGS. 4 and 5, is located in the space between the two hooks 2,3 in the zone for the U-shaped portions 4,5. The locking member 44 is capable to enclose a loading eye 26 or the like inserted into the load hook. The locking member is mounted rotatably in said bridge 19.

According to a preferred embodiment, a driven rotary device 45 is provided, which is capable via an axle 46 through the bridge 19 to rotate said locking member 44. The rotary device 45 preferably is capable by action of spring force to rotate the locking member to a first rotation position and by action of a driving device, such as as a rotary magnet or a hydraulic or pneumatic member of a known suitable kind to rotate the locking member to a second rotation position. The driving device and said spring are comprised in the rotary device 45.

In FIGS. 4 and 5 the locking member is shown in its first said rotation position. The said second rotation position is to be understood as a position, in which the locking member 44 is rotated through 90° in relation to said first rotation position. In the first rotation position the rod 26 can be moved in and out between the hooks 2,3, i.e. moved freely between the positions 26' and 26'' in FIG. 1. In the position 26'''', however, a rod cannot be moved upward, because the lower edges 47,48 of the locking member prevent such movement. In order to render possible disengagement, therefore, the locking member must be rotated through 90° to its second position by action of the rotary magnet, whereby the rod 26 can be moved from the position 26'''' to the position 26'''. When this has taken place, the load hook can be rotated so that the rod assumes the position 26'' while the locking member follows along with the rotation movement of the rod relative to the load hook. Thereafter the rod is moved to the position 26'.

The locking member remains thereafter in its first rotation position by action of said spring force. When the load hook is to be connected to a rod 26, the rod first is moved to the position 26''. Thereafter the locking member 44 is rotated to its second rotation position, whereby the rod is moved to the position 26''' and then to the position 26''''. Thereafter the locking member returns to its first rotation position by action of the spring force.

This embodiment, thus, eliminates entirely the risk of the rod 26 to drop out of the load hook.

In FIG. 9 a further embodiment of the invention is shown, where details corresponding to the aforementioned ones are designated by the same reference numerals.

According to this embodiment, a hydraulic cylinder 49 is attached to said bridge 19, so that its piston rod 50 extends through a hole in the bridge 19. The piston rod 50 is arranged to assume a first end position 50' where its outer end 51 is located close to said bridge 19, and to assume a second end position 50'' where its outer end is moved to the end of the load hook facing away from said axle attachment 17,18. In the second end position, thus, a rod in the position 26'''' is prevented from falling out of the load hook, while with the piston rod in its first end position 50' a rod 26 freely can be attached to and be disengaged from the load hook.

The hydraulic cylinder as well as the afore-mentioned rotary device and rotator are controlled by suitable control means from the operating place for the crane, to which the load hook is attached. It is, thus, possible to control attachment and disengagement of the load hook from the place, from which the crane is operated.

This lastmentioned embodiment is particularly suitable for loading and unloading of loads consisting of oblong objects, where the objects as such are enclosed by the load hook so that they are placed in the position 26''''. The piston rod in this case is utilized for clamping the oblong objects at the load hook.

This embodiment also is suitable for the erection of telephone and power poles, in which case the pole is clamped in the load hook in the way stated above, whereafter the pole by means of the crane and rotator can be erected and positioned as intended.

The present invention, of course, can be applied in many different connections, for example at cranes of different types, at industry robots etc.

The present invention, of course, can be modified in its details without abandoning the invention idea.

The present invention, therefore, must not be regarded restricted to the embodiments described above by way of examples, but can be varied within the scope of the attached claims.

I claim:

1. A load hook intended to be attached to the outer end of a crane jib, a crane wire or corresponding device, comprising: the load hook (1) including two substantially planar and parallel opposed hooks (2,3) connected to and extending in spaced parallel relationship with each other, each planar hook comprising a substantially U-shaped portion (4,5) in the plane of the hook forming a U-shaped groove (6,7) intended to support a carrying member connected to a load substantially perpendicular to the plane of said hook, an axle attachment having a hole (17,18) extending through each hook (2,3) located in a portion of the load hook (1) facing away and spaced from said U-shaped portion (4,5), said two hooks (2,3) connected to each other in a nonrotatable manner by a bridge (19) connected to the hooks between said axle attachment and said U-shaped portion, and the distance between the hooks (2,3) corresponds to the width of said U-shaped groove (6,7), and the opening of each hook (2,3), counted from the free end (12,13) of the U-shaped portion (4,5) to a portion (15,16) of the hook (2,3) opposed to said free end, corresponds to the width of said U-shaped groove (6,7) said two hooks are formed of heavy plate or corresponding material and have constant thickness.

2. A load hook as defined in claim 1, characterized in that the load hook, seen in a plane perpendicular to the plane of the hooks (2,3), has two parallel edges (20,21), where the distance between the edges (20,21) is the greatest width of the load hook (1).

3. A load hook as defined in claim 1, characterized in that a substantially U-shaped locking member (44) is arranged to partially enclose a load eye or corresponding member inserted in the load hook (1), and is located in the space between the two hooks (2,3), which locking member (44) is mounted rotatably in said bridge (19).

4. A load hook as defined in claim 3, characterized in that a driven rotary device (45) is arranged to rotate said locking member (44), which rotary device (45) preferably is capable to rotate the locking member (44) so as to assume a first rotation position by action of a spring force and to rotate the locking member (44) so as to assume a second rotation position by action of a driving device associated with the rotary device (45).

5. A load hook as defined in claim 1, characterized in that a hydraulic cylinder (49) is attached between the hooks (2,3), the piston rod (50) of said cylinder being capable to assume a first end position (50′) where its outer end is located close to said bridge (19), and to assume a second end position (50″) where its outer end is moved to the end of the load hook facing away from said axle attachment (17,18).

* * * * *